June 3, 1930.  D. F. PANCOAST  1,761,276
RESISTANCE WELDING APPARATUS
Filed Jan. 19, 1928

INVENTOR.
Donald F. Pancoast
BY
Fay, Oberlin & Fay
ATTORNEYS

Patented June 3, 1930

1,761,276

UNITED STATES PATENT OFFICE

DONALD F. PANCOAST, OF CLEVELAND, OHIO

RESISTANCE WELDING APPARATUS

Application filed January 19, 1928. Serial No. 247,922.

This invention as indicated relates to a resistance welding apparatus. More particularly it comprises apparatus for producing an alternating current having peculiar wave characteristics to the end that the time interval when the current is below that required for welding while passing from positive to negative value through zero, and reversely, is reduced to a minimum and thus the current is maintained throughout the greater period of its action at a value adequate to maintain a welding heat which persists substantially continuously at the welding point irrespective of the alternations of the current, and in this manner there may be produced a seam that is continuous throughout. To the accomplishment of the foregoing and related ends, said invention, then, consists of the means, hereinafter fully described and particularly pointed out in the claims.

The annexed drawings and the following description set forth in detail certain means of carrying out the invention, such disclosed means illustrating, however, but several of various applications of the principle of the invention.

Figure 2:
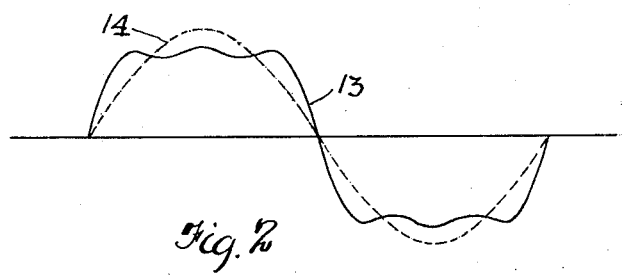
Figure 1:
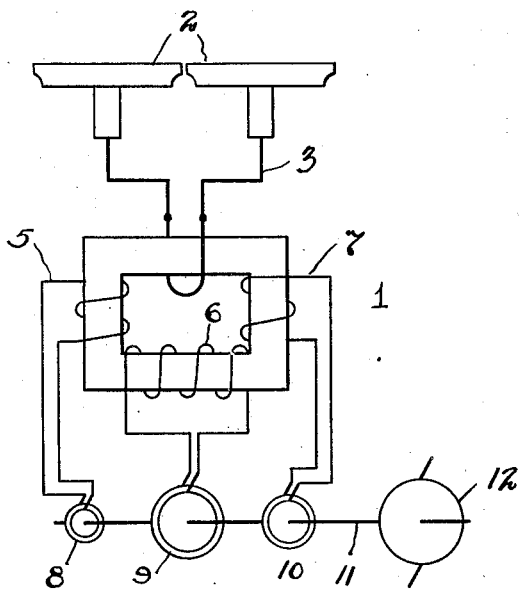

In said annexed drawings:

Fig. 1 is a diagrammatic view showing one form of apparatus embodying the principles of my invention; and Fig. 2 is a diagrammatic representation of the current wave as modified from the usual sine wave.

As is clearly shown in Fig. 1, the welding machine 1 is provided with the usual roller electrodes 2 adapted to establish contact with the margin of stock operated upon adjacent the seam line of a tube and which electrodes are the terminals of a single turn secondary winding 3 about one leg of a transformer core 4. The primary windings of the transformer core comprise the three windings 5, 6, 7, on the remaining three legs of the core, each winding being supplied by a separate alternator. The alternators 8, 9, 10, as illustrated may be mounted on a common shaft 11 driven by a direct current motor 12. The alternators deliver currents of such frequency amplitude and wave shape as to produce in the transformer a secondary current having the wave shape 13 shown in Fig. 2. The sine wave 14 having the same effective value as the modified wave produced by the apparatus herein described, has been shown in conjunction with the modified wave in Fig. 2. The modified wave illustrated has the formula I=1600 sine $\varpi t$ plus 400 sine $3\varpi t + 200$ sine $5\varpi t$.

As will be noted this wave rises to an amount adequate for welding after passing the zero point at a much more rapid rate than does the normal sine wave and consequently the time interval during which the current value is below that required to produce a welding heat is reduced materially. In this manner the natural heat radiation of the metal being welded is insufficient to cause a drop in temperature of such amount in the interval of the alternation as to preclude the formation of a perfect weld. The crest factor of an alternating current wave is the ratio of the maximum ordinate to the mean effective ordinate and for a sine wave is equal to the square root of 2. The form factor of an alternating current wave is the ratio of the mean effective ordinate to the mean ordinate and for a sine wave is $\dfrac{\pi}{2\sqrt{2}}$.

In order to provide a wave suitable for effective welding at a fair rate of speed, I desire to provide a wave having a peak factor as near as practicable approaching unity and a form factor also as closely as practicable approaching unity. In the wave illustrated in Fig. 2, the wave consists of a fundamental with a twenty-five (25) percent third harmonic and a twelve and one-half (12½) percent fifth harmonic, but those disclosed are only one combination of a large number of wave shapes which may be found suitable.

The method involved in this invention comprises the building up of an effective alternating current wave for resistance welding to the end that the rapid development of the heating value of the current will follow the zero point and reach an amount adequate for welding more rapidly than does a current having a sine wave and will cause such welding value to persist to a later point in the cycle as compared with a current having a sine wave.

Other modes of applying the principle of my invention may be employed instead of the one explained, change being made as regards the means herein disclosed provided those stated by any one of the following claims or their equivalents be employed or embodied therein.

I therefore particularly point out and distinctly claim as my invention:

1. An apparatus for resistance welding by means of an alternating current which comprises a transformer core, a plurality of primary windings thereon, a separate alternator connected to each of said windings, one of said windings and connected alternator being adapted to supply a current of approximately sine wave shape, another winding and connected alternator for producing an odd harmonic wave, said alternators being fixed relatively to each other to produce a resultant substantially flat wave, and a secondary winding upon said transformer connected with a pair of electrodes whereby a current is supplied to the work having a rapid rise from the zero point to a welding value and a persistence of current above minimum welding value with consequent substantially uninterrupted heating effect at the welding point.

2. An apparatus for resistance welding by means of an alternating current which comprises a transformer core, a plurality of primary windings thereon, a separate alternator connected to each of said windings, one of said windings and connected alternator being adapted to supply a current of approximately sine wave shape, other windings and connected alternators for producing a plurality of odd harmonic waves, said alternators being fixed relatively to each other to produce a resultant substantially flat wave, and a secondary winding upon said transformer connected with a pair of electrodes whereby a current is supplied to the work having a rapid rise from the zero point to a welding value and a persistence of current above minimum welding value with consequent substantially uninterrupted heating effect at the welding point.

3. An apparatus for resistance welding by means of an alternating current which comprises a transformer core, a plurality of primary windings thereon, a separate alternator connected to each of said windings, one of said windings and connected alternator being adapted to supply a current of approximately sine wave shape, another winding and connected alternator for producing a twenty-five (25) percent third harmonic wave, and another winding and connected alternator for producing a twelve and one-half (12½) percent fifth harmonic wave, said alternators being fixed relatively to each other to produce a resultant substantially flat wave, and a single turn secondary winding upon said transformer connected with a pair of electrodes whereby a current is supplied to the work having a rapid rise from the zero point to a welding value and a persistence of current above minimum welding value with consequent substantially uninterrupted heating effect at the welding point.

Signed by me this 16th day of January, 1928.

DONALD F. PANCOAST.